United States Patent Office 3,496,013
Patented Feb. 17, 1970

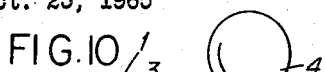
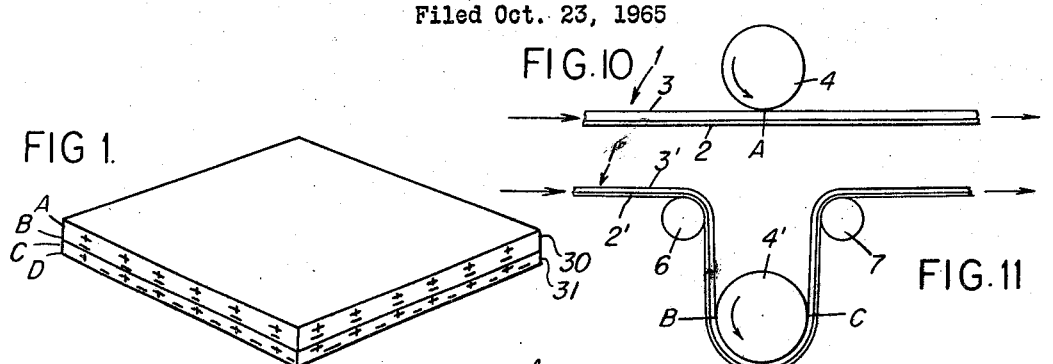
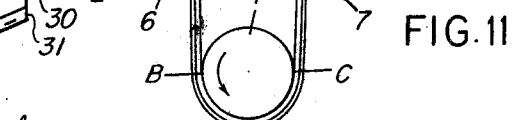
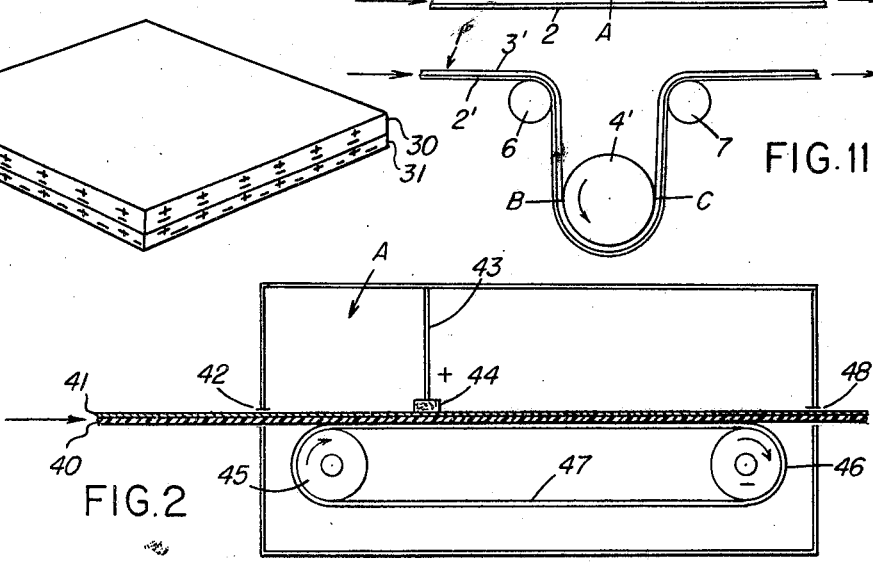
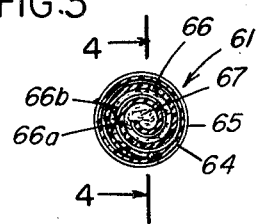
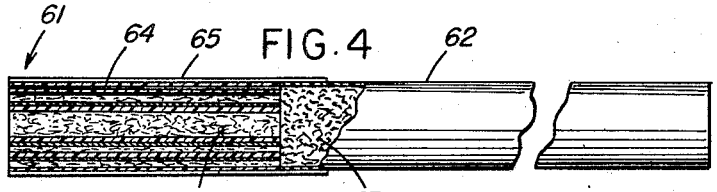
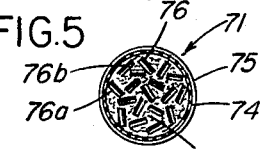
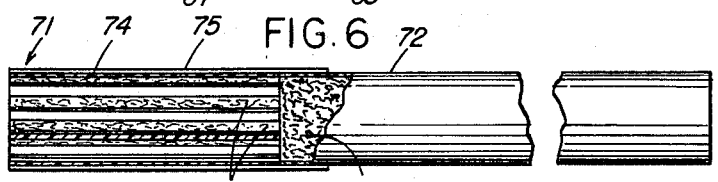
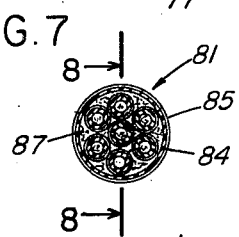
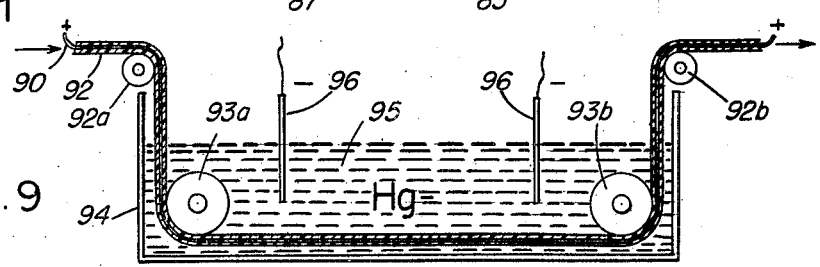

3,496,013
METALLIZED POLARETS AND METHODS FOR THEIR PRODUCTION
Lawrence M. Baxt, John R. McDowell, and Lawrence L. Stewart, Richmond, Va., assignors to Philip Morris Incorporated, New York, N.Y., a corporation of Virginia
Filed Oct. 23, 1965, Ser. No. 503,134
Int. Cl. A24f 7/00, 25/00; B01d 27/00
U.S. Cl. 117—227                    2 Claims

ABSTRACT OF THE DISCLOSURE

An electrified substance having opposite sides, one of which has an adherent conducting layer attached thereto, the substance exhibiting an electrical charge representing essentially a homocharge.

---

This invention relates to metallized polarets, to methods for their production and to filters containing the same. More particularly, the present invention relates to metallized polarets prepared from metallized plastic sheets, to methods for preparing the same and to novel filter constructions embodying said metallized polarets therein.

The term "polaret" is employed throughout this specification to designate an electrified substance which exhibits electrical charges of opposite sign on opposite faces, the charge being at least partially a volume effect and representing essentially a homocharge, in contradistinction to the combination of homocharges and heterocharges which are present in electrets.

While some polaret-like materials have been described in the prior art, such materials do not possess the high charges and long life which are possessed by the polarets of the present invention. In addition, the present materials are simpler to manufacture and to apply than either the known polaret-like materials or the known electret-like materials.

The present metallized polarets are particularly useful in filters for tobacco smoke, since they possess relatively higher charges than the prior art materials and, thereby, permit greater removal of undesirable materials from the tobacco smoke and since they permit simple but effective configurations of electrically charged materials in a filter.

By means of the present invention, novel metallized polarets are produced which possess properties superior to the properties of the materials known in the art. In addition to being particularly useful in filters for tobacco smoke, the present novel metallized polarets have been found useful in other types of filters, such as air filters, and to be useful in devices such as electrometers, microphones, and dosimeters, the present metallized polarets generally providing markedly increased sensitivity over the known polarets when employed in such devices.

The present metallized polarets are also particularly useful for the storage of information. They may be employed effectively as tapes and the like for the electronic storage of signals, as will be set forth in more detail later in this specification.

The novel metallized polarets of the present invention may be prepared from a polaret-forming material. The polaret-forming material should preferably have a volume resistivity of at least $10^{12}$, and most preferably $10^{14}$ ohm-cm., at room temperature. The polaret-forming material may, for example, be polymeric materials such as cellulose acetate, poly(vinylidene chloride), poly(chorotrifluoroethylene), poly(tetrafluoroethylene), poly(vinyl-chloride, poly(methylmethacrylate) and, as set forth above, polyethylene terephthalate and the like.

The polaret-forming materials may also be inorganic materials such as ceramics and the like. For example, they may be alkaline earth metal titanates, zirconates or the like, in ceramic or single crystalline form.

The polaret-forming material is preferably employed in the form of a sheet or film which may vary in thickness from about 0.1 to about 50 mils and which may be any desired width. For example, the sheet or film may be about 5 mils in thickness and may be an inch or less in width or it may be 10 feet or more in width.

The polaret-forming material is provided with a layer of conducting material, such as metal or carbon, which provides a backing for the polaret-forming material.

The conducting material should, preferably, be in the form of a relatively uniform layer having a thickness of at least 100 angstroms. The layer may be a deposited layer of aluminum, silver, nickel, copper, or the like; which has been applied by vacuum application, sputtering techniques, or by other means. Such a layer may vary from molecular thickness to 10 mils in thickness or more, so long as it functions as an electrical conductor. The conducting material might also be in the form of a sheet or film of metal, such as aluminum, tin, silver, nickel, copper, stainless steel, which is 0.01 mil to 1 inch or greater in thickness. The conducting material should, preferably, extend substantially across the entire surface of one of the charged surfaces of the polaret-forming material.

Other conducting materials than metal or carbon may also be employed as the conducting layer, provided only that they can be held on the polaret-forming material sufficiently well, can be made as a substantially uniform layer and are conducting in nature. For example, a thin layer of adhesive containing uniformly distributed graphite particles, carbon particles or metal particles capable of imparting electrical conductivity to the conducting layer.

For certain applications, it is advantageous to employ a magnetic material as the conducting layer. For example, the conducting layer may comprise a magnetic nickel-iron alloy which may be applied to the polaret-forming material as a thin film. Other magnetic materials include iron, nickel and cobalt in various forms and combinations. A particularly effective magnetic conducting layer can be made of nickel-iron alloys such as the Permalloys. These alloys and their methods of manufacture, are discussed in detail on pages 277–334 of Physics of Thin Films, Advances in Research and Development, vol. 1 (1963), edited by Georg Hass (Academic Press, New York and London).

Such a magnetic conducting layer serves a two-fold purpose and can be especially useful for applications involving the storage of large amounts of information, since the information can be retained both magnetically and electrically by such a material. Magnetic material of this type can also be utilized advantageously in applications involving filtration of charged aerosols.

If a metal sheet or film is employed, it may be held in place on the polaret-forming material by means of a suitable adhesive or by partially melting or dissolving the polaret-forming material so that it serves as an adhesive.

The metallized backing may be applied to either of the charge-bearing sides of the polaret-forming material, i.e., to either the positive or negative side of said materials, if said material has already been formed into a polaret.

The metallized backing may also be applied to the polaret-forming material prior to its formation into a polaret. Under such circumstances, the metallized backing, when in sheet form, may be applied to the polaret-forming material by means of an adhesive. The metallized backing may also be applied by partially melting the polaret-forming material and permitting the melted material to function as an adhesive. The metallic or metallized backing may also be applied to the polaret-forming material, either before or after the polaret-forming material has been converted to a polaret, by conventional vacuum deposition techniques and the like. For example, a conventional commercially available sheet of metallized polyethylene terephthalate (metallized "Mylar"), can be employed effectively as the metallized polaret-forming material for conversion to a metallized polaret in accordance with the present invention.

It is advantageous to apply the metallized backing to the polaret-forming material prior to the polaret formation, since in such a case the metallized backing may serve as one of the electrodes during the polaret-forming operation, wherein the charge is imparted to the polaret-forming materials and the same is converted to a polaret.

The metallized polarets of the present invention comprise polarets having two opposite sides, each having an electrical charge differing from the other, one of said sides having an adherent conductive layer attached thereto over substantially its entire surface. Thus, the term "metallized polarets" as used throughout this specification, is intended to encompass polarets having an adherent conductive layer attached thereto, whether the layer is made of metal, carbon or some other electrically conductive material. The conductive layer may be a sheet of conducting material, such as aluminum or tin foil, or may be a layer of conducting material, such as carbon particles, graphite, brass, copper or bronze particles which have been sprayed on, using a suitable adhesive, such as nitrocellulose, polyurethane, ethyl cellulose, waxes, and the like, or it may comprise a conducting material, such as aluminum, which have been vacuum deposited on the polaret or polaret-forming material or the conducting layer may be applied in some other suitable manner.

As discussed above, the polarets may be prepared prior to or after the application of the metallized backing to the polaret-forming material. In either case, the same conditions may be employed to convert the polaret-forming material to polarets. The following discusssion with regard to one general method which may be employed for the conversion of the polaret-forming material to polarets applies equally as well to the production of polarets from polaret-forming materials either with or without metallic backing.

While the process of the present invention is particularly valuable for the production of polyethylene terephthalate polarets, it can also be employed for the manufacture of other types of polarets employing polaret-forming materials. Polaret-forming materials which may be employed include many of the known polaret-forming materials and similar polaret-forming materials as set forth earlier in this specification.

The polyethylene terephthalate which may be employed in accordance with the present invention can be the conventional polymer in film form, for example, it may be film of the type marketed under the trade name Mylar. It may also comprise a solid piece of polyethylene terephthalate for example, a disk of this material, or it may comprise a solid material which is composed mainly of polyethylene terephthalate but which may contain minor amounts of other materials. It may also be coated with water repellant materials, such as silicone resin or polytetrafluoroethylene. It may also contain semiconductors or ferroelectrics such as barium or calcium titanate, or may be coated with resins containing such semiconductors or ferroelectrics.

The number average molecular weight of the polyethylene terephthalate material used is normally from about 15,000 to about 25,000. The size and shape of the piece of polyethylene terephthalate may vary. For example, it may be disk shaped, doughnut shaped, dumbbell shaped, pyramid shaped, or the like. However, it should preferably have two relatively flat surfaces which are on opposite sides of the piece, such as in a flat sheet or plate.

The polaret-forming material may be in film or sheet form or may comprise a solid piece. The size and shape of the piece of polaret-forming material may vary depending upon the particular embodiment of the process which is employed. However, it should preferably have two relatively flat surfaces which are on opposite sides of the piece, such as in a flat sheet or plate. For the continuous process embodiments for making the metallized polarets of the present invention, the polaret-forming material should, as will be set forth in more detail later in this specification, be in such a form as permits such operation.

The process for producing the polaret portion of the metallized polarets of the present invention comprises, in general, placing a solid piece of polaret-forming material between two electrodes and applying an electric field by means of the two electrodes across the polaret-forming material at a temperature below the glass temperature of the polaret-forming material.

The electric field which is maintained across the polaret-forming material during the preparation of the polaret, in accordance with the process of the present invention, may vary from about 0.5 to about 2000 kv./cm., but is preferably about 50 to 200 kv./cm. The electric field is provided by means of any suitable direct current power supply, which is connected to at least one pair of electrodes, which, for example, may be flat plates. The voltage which is required will depend on the spacing of the electrodes. For example, when flat plates are employed, the voltage may be determined from the formula:

$$E = V/d$$

where E is the electric field (in kilovolts per centimeter), V is the voltage applied between the plates (in kilovolts), and d is the distance between the plates (in centimeters). Thus, for example, a voltage of 4 kilovolts (4,000 volts) will be necessary to provide a field of about 200 kilovolts per centimeter, when the spacing between the plates is about 0.02 cm.

Before being placed between the electrodes, the polaret-forming material, for example, polyethylene terephthalate, is either obtained or made into a suitable shape, for example, disk shaped, plate shaped, sheet or rod shaped, or the like, tube shaped, bundles of tubes to use in filters, before undergoing the polaret-forming steps of the present invention.

In a preferred embodiment of the present invention, the polaret-forming material is preferably in the form of a sheet, ribbon, rod or other so-called continuous form, all of which, it will be understood, are encompassed by the word "sheet" or employed herein. As will appear later in this specification, the polaret-forming material is for some embodiments of the invention preferred in flexible sheet form, as compared with sheet form, which includes flexible, semirigid and rigid forms of the material. The sheet can be moved through the electric field under conditions such that each portion of the sheet is suitably exposed to the necessary conditions of time, electrical field and temperature to obtain the desired result.

When the piece of polaret-forming material is not in sheet form, it may be in the form of a piece which may vary greatly in size and shape. However, it will generally have a thickness of from about 0.25 to about 10 mils and, for convenience, will be referred to hereinafter as a disk, it being understood, however, that any suitable shape of polaret-forming material may be employed.

In a most preferred method for preparing the metallized polarets of the present invention, a sheet of metallized polaret-forming material, preferably in a continuous form, i.e., in the form of a relatively long piece is moved through a zone in such a manner that the metallized backing on the polaret-forming material becomes an electrode and an electric field is created between the metallized backing and a second electrode, the polaret-forming material passing through said electric field.

In one embodiment of the present invention, a number of polaret-forming materials, and particularly polyethylene terephthalate, disks or plates may be formed into polarets in a single operation, wherein the individual disks or plates are placed in a series configuration between the electrodes employed during the polaret-forming process. In such a case, the disks or plates are preferably oriented with flat surfaces in a parallel arrangement. They are also preferably separated by aluminum foil or similar separating material. Most preferably, the disks or the like are metallized on one side, as described above.

While the following discussion is directed primarily at the formation of a single polaret, it is to be understood that more than one polaret or metallized polaret can be formed at a single time the conditions of time, temperature and the like being substantially the same, except that the time and applied voltage will vary, depending on the number of disks or plates which are involved.

The disk may be placed between two disks of aluminum foil or similar material and for one embodiment of the invention, a stack of metallized disks is employed with the metallized portion dividing each polaret-forming material from the next. The disk or disks are then placed between metal electrodes, such as stainless steel disks or any other suitable material, having the same shape or being sufficiently large to cover the entire surface of the disk made of polaret-forming material, such as polyethylene terephthalate. Thus, for example, the resulting assembly, comprises a polyethylene terephthalate disk, sandwiched between two pieces of aluminum foil being in contact with a stainless steel electrode. The polaret-forming material should, preferably, be larger than the stainless steel electrodes by a margin or border of at least 20 millimeters in order to prevent any electrical breakdown in the surrounding atmosphere. The disk, for example, in an assembly such as described above, is maintained at a temperature below the glass temperature of the polaret-forming material, and preferably at room temperature, i.e., 20–30° C., and a voltage is applied, for example, between stainless steel disks, to give a field strength of from about 0.5 to about 2000 kilovolts per centimeter and preferably from about 100 to 600 kilovolts per centimeter. The voltage is maintained in this manner for a period of from about $10^{-6}$ seconds to about 12 hours or more and preferably from about 0.01 second to about 1 hour. The polaret can then be separated from the electrodes and from the aluminum or similar foil, when such foil has been employed, and is then ready for use as a polaret.

The polaret can be, if desired, placed or maintained in a "keeper," for example, a wrapping of aluminum foil or the like, in order to preserve the charges thereon until use.

In a preferred embodiment of the present invention, a sheet or other continuous form of polaret-forming material is passed through two temperature controlled zones, each of which is maintained in association with an electric field.

The polaret-forming material may be in flexible sheet form, for example in the form of 0.1 to 50 mil sheeting or may be in ribbon form, tape form or any other form which is relatively continuous in nature and which permits passage of the polaret-forming material through several distinct zones in a relatively continuous operation. The polaret-forming material for this embodiment of the invention is preferably constructed in such a manner that it possesses two relatively flat, relatively parallel surfaces which, after the polaret is formed, will constitute the oppositely charged faces of the polaret. The material is also preferably of such a nature chemically and physically that it can be made in sheet form or the like. Thus, the polaret-forming material should be capable of formation, for example, by extrusion, in a relatively continuous form and, where it is to be passed through a non-linear path, it should also preferably be relatively flexible when in sheet form.

In the zone wherein the polaret-forming material is converted to a polaret, an electric field is maintained across the polaret-forming material. The electric field may vary from about 0.5 to about 2000 kilovolts per centimeter and may be provided, for example, by means of flat metal plates between which the voltage is applied from a suitable source of direct current power supply. The temperature which is maintained in this zone may vary from a very low temperature such as $-100°$ C. or lower to a temperature below the glass temperature of the polaret-forming material. However, it is preferably maintained at room temperature, i.e., about 20 to 30° C. The polaret-forming material is then passed through said zone at a rate which is sufficient to maintain any one point on the polaret-forming material in said zone for a period of from about one microsecond to 12 hours or more. When the polaret-forming material is polyethylene terephthalate, which is the preferred material of the present invention, this zone should preferably be maintained at a temperature below about 80° C. and should, most preferably, be maintained at a temperature of from about 20° C. to 30° C.

The polaret-forming zone discussed above may comprise the space between conducting plates, such as highly polished steel plates, which are maintained at a temperature which is sufficient to maintain the zone between the plates at the desired level and between which the desired voltage is maintained, or may comprise the space between rolls, such as polished aluminum or steel rolls, which are sufficient to accomplish the same result.

The conducting layer may, if desired, be applied to the polaret after it has been formed. Preferably, however, the conducting layer is applied to the polaret-forming material prior to its conversion into a polaret. As will be described hereinafter, operating in this manner permits simplified and improved methods of manufacture.

The continuous process for manufacturing polarets can have various modifications in order to accomplish the desired result. However, simple passage of the polaret-forming material, either with or without a conducting layer, between plates, as indicated above, or between charged rollers for a sufficient period of time to subject the polaret-forming material to the conditions set forth above provide satisfactory means for accomplishing the purpose of the present invention. Obviously, many combinations of belts, rollers, plates and the like may be employed. One of the most preferred methods for producing the metallized polarets of the present invention is illustrated in FIG. 2 in the attached drawing, which will be described hereinafter in detail.

In the manufacture of polarets, it is of advantage from a commercial viewpoint to manufacture the polarets by a continuous process. Such a process would normally involve the use of rollers or plates similar to those described earlier in this specification, whereby the polaret-forming material passes around and by said rollers, which are maintained at temperatures in accordance with the particular requirements of the system. One problem which results from manufacturing in this manner arises from the fact that different lengths of time are required for contact of the material with the electric field and exposure of the material to the temperature which is required. Configurations which are particularly advantageous in order to achieve the desired degree of electrical contact and temperature control will be discussed later in this application in connection with the attached drawing.

One of the most effective methods for utilizing a continuous process for the production of metallized polarets involves the use of the metallized backing as an electrode. Thus, particularly preferred embodiments of the present invention include the continuous production of metallized polarets by means of methods wherein the metallized backing on the polaret-forming material is contacted by suitable means, for example, brushes or rollers, to impart a charge thereto and an opposite charge is imparted to the side of the polaret-forming material which is opposite the metallized or conducting backing on the metallized polaret. While the charge is applied, the metallized polaret-forming material is passed through a zone maintained under the temperature conditions which are set forth earlier in this specification.

Metallized polarets formed in accordance with the present invention may be used in filters for tobacco smoke, as will be discussed in more detail later in this application. They may, for example, be used in a cigarette filter by being cut into pieces about 0.5 mil thick by 2 mm. wide by 5–20 mm. in length and crimped or uncrimped placed in a longitudinal direction within a conventional filter cylinder in such a manner that one end of each piece is in contact with the smoker's mouth, i.e. is grounded by means of the moisture in the smoker's mouth.

The effectiveness of the present materials as components of filters for tobacco smoke is based on the fact that they are capable of removing charged particles therefrom.

The non-gaseous portion of cigarette smoke is generally composed of three types of particles, on an electrical basis. There are, in general, positively charged particles, negatively charged particles and neutral particles. Generally, approximately half or somewhat less of the particles in tobacco smoke are electrically neutral and the remainder of the particles are about evenly divided between positive particles and negative particles.

The removal of charged particles from tobacco smoke has often been found desirable, in order to selectively eliminate undesirable smoke constituents and to aid in overall filter efficiency.

The removal of certain charged particles is also believed to accomplish certain physiological and psychological effects. Filters incorporating the metallized polarets of the present invention provide a means for the controlled removal of one or both kinds of charged particles from tobacco smoke. They can be employed as well in any other application in which particulate matter is to be removed from a gaseous medium.

While polarets have been employed to remove certain charged particles from tobacco smoke, they have been found to have limited effectiveness for this purpose for a number of reasons. For example, the fact that the polarets possess different charges on each face does not permit a net field when they are used in a filter or other device. Thus, there is no opportunity for selectivity in employing such materials unless unusual and difficult steps are taken to incorporate the polarets in the filter structure in such a manner that the charges can be adequately controlled to accomplish a desired result. In other words, there is no effective way in which to ground such polarets.

The present metallized polarets overcome the disadvantages of the ordinary polarets and make possible a new type of electrically charged material for use in filters. The use of the present metallized polarets in filters permits the advantageous distribution of single charges in a filter with the accurate control of the charge distribution within the filter.

While we do not wish to be bound by any particular theories, we believe that the reason for the effectiveness of the present metallized polarets resides in the fact that this particular type of construction results in a single charge on the metallized polaret unit. The principle behind this result can be seen by reference to FIG. 1 in the drawing. Referring to FIG. 1, it can be seen that the dielectric or polaret-forming material has a positive charge at A and a negative charge at B. A metal film is affixed to the negative side so that, by the so-called image effect, a positive charge is trapped at C and a negative charge is repelled to D. This charge at D can be run-to-ground easily. Thus, since the charges at B and C neutralize each other, only a positive charge is left at A. This single charge is exceedingly stable.

We have observed with the present metallized polarets that greatly increased charges can be obtained. The increase in charge is of a degree which is completely unexpected, amounting to 3- to 4-fold increase over that which is obtained in the absence of metallized backing. The increased charges have been found to be completely consistent and reproducible. While we do not wish to be bound by any particular theory, we believe that the main reason for this unanticipated result is that the thin metal film adhering to the plastic body gives better electrical contact and hence permits a more uniform and greater electrical flow.

The present metallized polarets also make possible a new type of material and a new method for the storage of information. They can be employed as electronically-receptive tapes for use in tape recorders and similar devices, being adaptable to the superimposition on the charged polaret surface of a pattern of electronic signals which may be imparted thereto under conditions similar to those set forth earlier in this application.

It is also possible to employ a metallized polaret-forming tape upon which a series of signals are superimposed by means set forth earlier in this specification, such that the tape becomes, in effect, a series of polarets which are connected together, either directly or with intervals where no charge is imposed on the polaret-forming material. Such tapes are particularly valuable when the metallized backing on the polaret-forming material is magnetic in nature, since such tapes permit the superimposition thereon of dual signals, both electric and magnetic, to permit the simultaneous recording of two signals along the same length of tape. Such tapes have obvious value for such fields as television recording, wherein a visual signal and an audio signal are simultaneously received and recorded.

The ability of the present metallized polaret-forming materials to hold electrical charges of varying degree and/or opposite sign, even though those charges are immediately adjacent to one another, permits the utilization of these materials as recording tapes as indicated above, and also permits their use in the manufacture of filter elements. Such filter elements can have a variety of charges in a variety of patterns and can be shaped in accordance with a multitude of designs for filter applications in such a manner that positive and negative charges can be formed in many different arrays in order to best accomplish the purposes of the particular aerosol filtration involved. It is particularly advantageous, for certain applications, that the metallized backing be magnetic in nature so that a particular filter construction can employ electric as well as magnetic means for the removal of undesirable particles from the aerosol.

The invention is more fully illustrated in the attached drawing, wherein:

FIG. 1 is an isometric view of a polaret produced in accordance with the present invention.

FIG. 2 is a schematic diagram of a method for making polarets in accordance with the present invention.

FIG. 3 is an end view of a cigarette embodying the present invention.

FIG. 4 is a longitudinal view of a cigarette embodying the present invention and is shown partially cut away as a cross-section of the cigarette shown in FIG. 3, taken on the lines 4—4 of FIG. 3.

FIG. 5 is an end view of a cigarette embodying the present invention.

FIG. 6 is a longitudinal view of a cigarette embodying the present invention and is shown partially cut away as a cross-section of the cigarette shown in FIG. 5, taken on the lines 6—6 of FIG. 5.

FIG. 7 is an end view of a cigarette embodying the present invention.

FIG. 8 is a longitudinal view of a cigarette embodying the present invention and is shown partially cut away as a cross-section of the cigarette shown in FIG. 7, taken on the lines 8—8 of FIG. 7.

FIG. 9 is a schematic view of one embodiment of the present invention.

FIG. 10 is a schematic view of one embodiment of the present invention.

FIG. 11 is a schematic view of one embodiment of the present invention.

Referring more particularly to FIG. 1, a metallized polaret is shown in isometric view. A layer of polaret-forming material 30 is shown with a conducting layer 31 attached thereto. In the polaret-forming material, positive charges are indicated at A and negative charges are indicated at B. In the conducting layer, positive charges are indicated at C and negative charges are indicated at D.

Referring more particularly to FIG. 2, a preferred method for producing the metallized polarets of the present invention is illustrated. In FIG. 2, a film 40 of polaret-forming material having adhered thereto a layer of conducting material 41 is introduced into zone A opening 42. Zone A is maintained at a temperature below the glass temperature of the polaret-forming material. Through electric line 43, a positive charge is imposed on a brush 44, which is in electrical contact with the surface of the layer of conducting material 41 moving through zone A. Negatively charged rolls 45 and 46 move in the indicated directions, whereby belt 47 is moved in the indicated direction carrying polaret-forming material 40 with its conducting coating 41, as shown, through zone A and out through opening 48. Belt 47 is made of a conducting material, such as polished stainless steel and the charge on rolls 45 and 46 is imparted to belt 47 whereby a field is formed between the surface of belt 47 and the conducting coating 41 of the polaret-forming material, the field strength being from about 0.5 to about 2000 kilovolts per centimeter. The use of zone A is desirable in order to maintain a uniform temperature in the polaret-forming operation. However, the same operation may simply be conducted in an open room, provided the temperature is maintained so the glass temperature of the polaret-forming material is not reached.

Referring more particularly to FIGS. 3 and 4, there is shown a cigarette 61 having a paper cylinder 62, defining the body of the cigarette. Shredded tobacco 63 (also referred to herein as "filler") is contained within cylinder 62. Paper cylinder 64 is positioned at the other end from the shredded tobacco so that its end abuts one end of paper cylinder 62. Cylinder 64 generally defines the filter unit of cigarette 61. The filter unit, which is dened by paper cylinder 64 is joined to the filler section, which is defined by paper cylinder 62, by paper cylinder 65, which covers all of paper cylinder 64 and a portion of paper cylinder 62. The filter section defined by paper cylinder 64 contains a metallized polaret 66, having a polaret layer 66a and a metal layer 66b. The metallized polaret 66 is generally spirally wound within cylinder 64, as indicated. In this embodiment, the spaces formed by metallized polaret 66 in cylinder 62 are filled by cellulose acetate fibers 67, although other filter materials may be employed, if desired, or the space may be left empty. It is important, however, that the metal layer 66b be in contact with the smoker's mouth, and is thereby grounded, when cigarette 61 is smoked.

Referring more particularly to FIGS. 5 and 6, there is shown a cigarette 71 having a paper cylinder 72, defining the body of the cigarette. Shredded tobacco 73 (also referred to herein as "filler") is contained within cylinder 72. Paper cylinder 74 is positioned at the other end from the shredded tobacco so that its end abuts one end of paper cylinder 72. Cylinder 74 generally defines the filter unit of cigarette 71. The filter unit, which is defined by paper cylinder 74 is joined to the filler section, which is defined by paper cylinder 72, by paper cylinder 75, which covers all of paper cylinder 74 and a portion of paper cylinder 72. The filter section defined by paper cylinder 74 contains metallized polarets 76, having polaret layers 76a and metal layers 76b. The metallized polarets 76 are positioned substantially longitudinally in cylinder 72 with one end of each metal layer 76b extending to the end of the filter, so that it is in contact with the smoker's mouth, and is thereby grounded. In this embodiment, the spaces formed by metallized polarets 76 in cylinder 72 are filled with cellulose acetate fibers 67, although other filter materials may be employed, if desired, or the space may be left empty.

Referring more particularly to FIGS. 7 and 8, there is shown a cigarette 81 having a paper cylinder 82, defining the body of the cigarette. Shredded tobacco 83 (also referred to herein as "filler") is contained within cylinder 82. Paper cylinder 84 is positioned at the other end from the shredded tobacco so that its end abuts one end of paper cylinder 82. Cylinder 84 generally defines the filter unit of cigarette 81. The filter unit, which is defined by paper cylinder 84 is joined to the filler section, which is defined by paper cylinder 82, by paper cylinder 85, which covers all of paper cylinder 84 and a portion of paper cylinder 82. The filter section defined by paper cylinder 84 contains a plurality of metallized polaret cylinders 86, having polaret layers 86a and metal layers 86b. The metallized polaret cylinders 86 are positioned substantially longitudinally in cylinder 82 with one end of each metal layer 86b extending to the end of the filter, so that it is in contact with the smoker's mouth, and is thereby grounded. In this embodiment, the spaces formed by metallized polarets 86 in cylinder 82 are filled with cellulose acetate fibers 87, although other filter materials may be employed, if desired, or the space may be left empty.

Referring more particularly to FIG. 9, a metal wire 90 having a coating of a polaret-forming material 91 is passed by means of rollers 92a and b and 93a and b through a tank 94 containing liquid mercury 95. Electrodes 96 having a negative charge are immersed in the liquid mercury. Either one electrode or several electrodes, maintained at the same potential, may be employed for this purpose. The wire 90 and its coating 91 passes through mercury 95 in the indicated direction. Mercury 95 is maintained at a tempearture which is below the glass temperature of the polaret-forming material 91. Wire 90 is connected to a source of positive charge so that the polaret-forming material 91 is placed in an electric field formed between wire 90 and mercury 95, as the wire 90 passes through mercury 95. Wire 90 is passed through mercury 95 at a rate such that any point on polaret-forming material 91 is maintained in the electric field for a period of time sufficient to convert the polaret-forming material to a polaret. The resulting polaret-coated wire is recovered from roller 92b. The polaret-coated wire can be employed in a variety of ways. For example, it can be cut up into small pieces, which can be employed as elements in filters or it can be employed in a variety of weaves or meshes, as a filter material. It further can be employed for the storage of information, by superimposing additional electric charges thereon in a similar manner to the manner in which the polaret coating on the wire was prepared.

Referring more particularly to FIG. 10, a metal roller 4 is connected to a power supply (not shown), whereby the metal roller is negatively charged. A film of metallized polaret-forming material 1, comprised of polaret-forming material 3 and metal coating 2, is passed in contact with roller 4, as indicated. Metal coating 2 is connected by means of a roller or brush (not shown) to ground 5, whereby a potential is applied between metal coating 2 and roller 4 at the point approximately indicated by A on polaret-forming material 3.

Referring more particularly to FIG. 11, a configuration similar to that schematically illustrated in FIG. 10 except that rollers 6 and 7 are employed to bring metallized polaret-forming material 1' into greater contact with roller 4', being in contact with roller 4' between points B and C. Such a configuration permits a better controlled production of metallized polarets than the configuration shown in FIG. 10.

The following examples are illustrative:

EXAMPLE 1

A 1 mil sample of metallized Mylar, i.e., 1 mil Mylar (polyethylene terephthalate) having on one of its surfaces a vacuum deposited coating 0.1 mil thick of aluminum, and, for comparison, a sample of 1 mil Mylar were cut to appropriate size (about 7" x 7" squares) for the preparation of polarets. The samples were subjected for 10 seconds each to a range of voltages between two electrodes. The results of these tests were plotted in graph form, wherein charge density was plotted against applied voltage. In the graph, which is not presented in this application, the curve of charge vs. applied voltage for the metallized film rises, at an application of 3 kilovolts (total voltage drop) to about $45 \times 10^{-9}$ coulombs/cm.$^2$. The curve for plain Mylar rises simply to $11 \times 10^{-9}$ coulombs/cm.$^2$. At about 1.2 kilovolts and then levels off. It was found that the curve of the plain Mylar could not be extended to the high voltages of the 1 mil metallized film, because discharge through the polymer occurred below 2 kilovolts. It can be projected, however, from the course of the curve that the application of higher voltages even without discharge would not affect the surface charge density materially. Both of these polarets were found to have highly stable homocharges in moist atmospheres.

EXAMPLE 2

Using a configuration which is schematically illustrated in FIG. 10, a metal roll 4" in diameter and 8" long (roll 4) was connected to a Sorenson power supply. The smaller metal rolls, 6 and 7, shown in FIG. 11 were ¼" in diameter and of the same length as the larger roll. Metallized Mylar film which was 1 mil thick was placed in contact with roll 4 and passed by roll 4 at the rate of 1000' per minute, as is shown in FIG. 10. A potential of 2 kilovolts was applied between the metal roll and a ground attached by suitable means (not shown), such as a brush or roller, to the metallized surface of the Mylar film. From the set-up schematically shown in FIG. 10, where the material was barely touching the roll, the electric charge obtained on the polaret was $2 \times 10^{-9}$ coulombs/cm.$^2$. From the set-up in FIG. 11, where the similar metallized Mylar film was passed at the same rate in contact over approximately 80% of the circumference of roll 4, due to the orientation of rolls 5 and 6, the charge obtained was $45 \times 10^{-9}$ coulombs/cm.$^2$.

EXAMPLES 3–10

Eight samples (8" x 8" of polaret-forming materials having a coating of metal on one surface) were obtained commercially. These samples were tested for polaret properties by subjecting them to as high a D.C. field as possible (limited by dielectric breakdown). The field ranged from 100 to 2000 kv. All samples were made using vacuum deposition techniques. The results of these tests, given in Table I, show that the metallized backing gave enhanced charges. In Table I, the field is given in kilovolts (kv.) and the charge is given in $10^{-9}$ coulombs/cm.$^2$.

TABLE I

| Example: | Material | Metal coating | Field | Charge |
|---|---|---|---|---|
| 3 | 1 mil Mylar | Copper | 1,180 | 32 |
| 4 | do | Nickel | 1,180 | 32 |
| 5 | 5 mil Mylar | Aluminum | 790 | 17 |
| 6 | 10 mil Mylar | do | 470 | 14 |
| 7 | 1 mil styrene | do | 1,180 | 40 |
| 8 | 1.4 mil vinyl | do | 420 | 16 |
| 9 | do | Silver | 420 | 18 |
| 10 | 1 mil Mylar | Aluminum | 1,180 | 49 |

EXAMPLE 11

Metallized Mylar tape 1 mil in thickness, 1 inch in width and 200 feet in length was passed between a grounded anvil and a very small diameter roller. The roller touched the surface of the tape slightly. Positive and negative voltages (2 kv. maximum) were applied to the roller in a pattern corresponding to the electrical impulses produced by a human voice speaking into a microphone so that a series of narrow bands of varying charges was imposed on the tape.

The tape was then run through a sensing device. The impulses were transposed through a radio speaker into the same sounds as the sounds that had caused the charging impulses. Thus, the sounds of the human voice were recorded on the tape and retrieved from it.

As used throughout this specification, unless otherwise specified, all parts and percentages are by weight. In addition, the following definitions apply:

Dipole moment is a mathematical entity. It is the product of one of the charges of a dipole unit and the distance separating the two charges in said dipole unit.

Volume resistivity is the resistance that a centimeter cube of a substance offers to the passage of electricity, the current being perpendicular to the two parallel faces of the cube.

Glass temperature, which may also be referred to as glass transition temperature or as second order transition temperature, is the temperature at which the free energy, entropy and enthalpy curves are continuous and the heat capacity curve is discontinuous for an amorphous polymer or in an amorphous region of a crystalline polymer. The glass temperature is characterized as the point at which there is a change in the molecular freedom of a material and is further characterized as a point of change between a rigid state or structure of a material and a rubbery state of a material.

We claim:
1. A process for producing a metallized electrified article exhibiting only a homocharge from an electrified body having at least two substantially parallel surfaces, comprising the steps of maintaining said body at a temperature below the glass temperature of the body material while applying to said body an electrical field of from 0.5 to 2,000 kilovolts and applying a metallic layer to an exclusive one of said body surfaces.

2. A metallized electrified article produced in accordance with the process of claim 1.

References Cited

UNITED STATES PATENTS

| 2,916,038 | 12/1959 | Wade. | |
| 3,000,735 | 9/1961 | Gunning et al. | 117—17.5 |
| 3,005,707 | 10/1961 | Kallmann et al. | 96—1 |
| 3,268,331 | 8/1966 | Harper | 96—1 |

FOREIGN PATENTS

| 292,479 | 6/1929 | Great Britain. |
| 994,107 | 6/1965 | Great Britain. |

WILLIAM L. JARVIS, Primary Examiner

U.S. Cl. X.R.

117—93, 138.8, 160; 131—262

UNITED STATES PATENT OFFICE
CERTIFICATE OF CORRECTION

Patent No. 3,496,013                              February 17, 1970

Lawrence M. Baxt et al.

It is certified that error appears in the above identified patent and that said Letters Patent are hereby corrected as shown below:

Column 1, line 69, "(chorotri-" should read -- (chlorotri- --. Column 4, line 54, "or" should read -- as --. Column 9, line 55, "dened" should read -- defined --. Column 12, line 50, "electrified" should read -- unelectrified --.

Signed and sealed this 24th day of November 1970.

(SEAL)
Attest:

Edward M. Fletcher, Jr.                      WILLIAM E. SCHUYLER, JR.
Attesting Officer                                  Commissioner of Patents